Patented Dec. 1, 1942

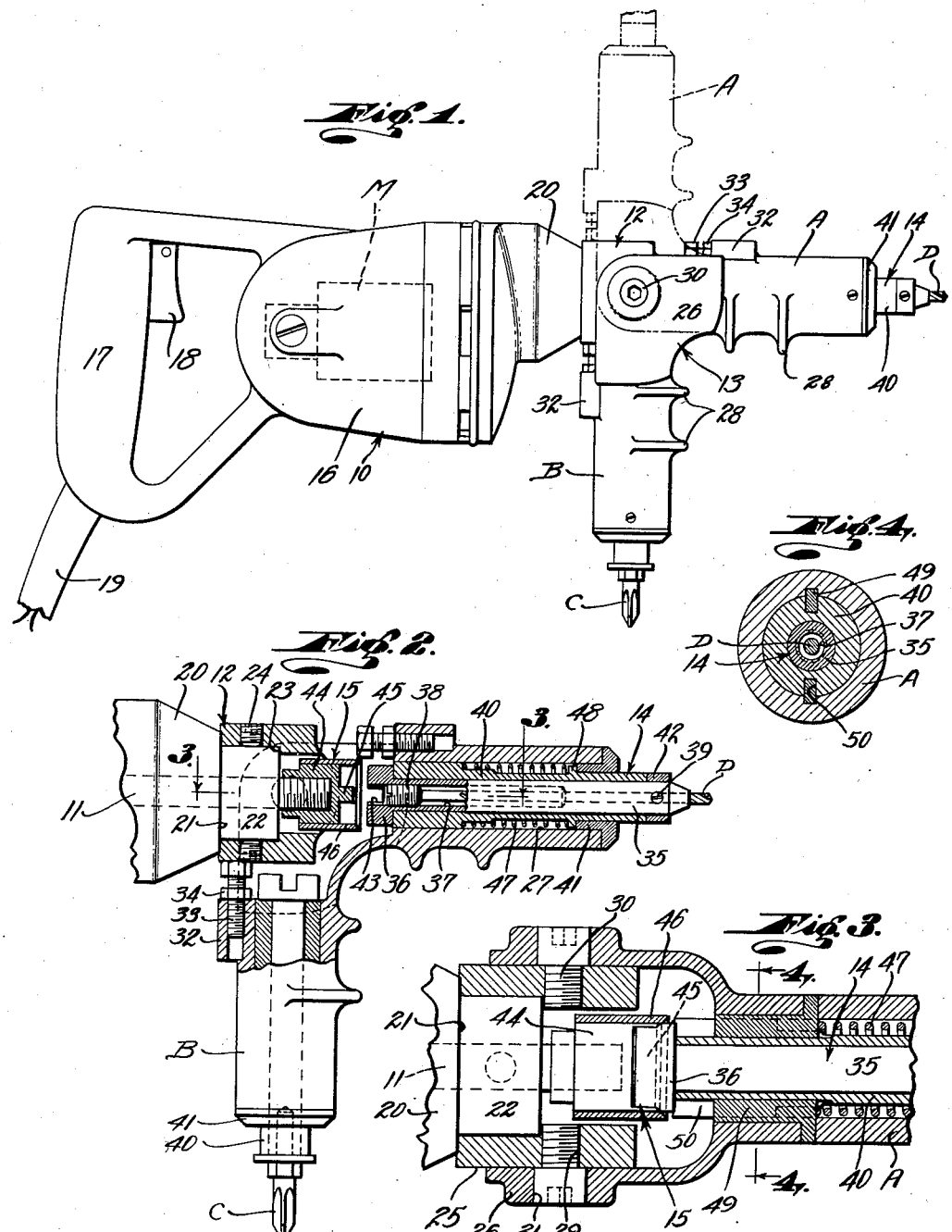

2,303,565

UNITED STATES PATENT OFFICE 2,303,565

POWER TOOL

Marcos H. Luna, San Gabriel, Calif., assignor to Essick Machinery Company, Los Angeles, Calif., a partnership composed of Newman Essick and Bryant Essick Application May 16, 1941, Serial No. 393,761

10 Claims. (Cl. 77—25)

This invention relates to tools and relates more particularly to manually manipulated power driven tools. A general object of this invention is to provide a simple, practical and effective tool of this character operable to successively perform a plurality of operations differing in character without alteration and without transferring or exchanging the bits, drills, counter-drills, riveting heads or other instrumentalities employed in the operations.

In many cases where power driven hand tools are used it is necessary to have two or more such tools at hand in order to expedite the performance of successive operations. For example, where a plurality of openings are to be drilled and then counter-bored, it is necessary to have one power tool for drilling the openings and another power tool for counter-boring the openings, one tool being equipped with a drill and the other being equipped with a counter-drill. Because of the difficulty that a single operator encounters in handling the two tools and their power carrying wires, it is usually found necessary to have an operator for each of the power tools.

Another object of this invention is to provide a compact, readily handled and manipulated power tool adapted to perform a plurality of operations, differing in character, in rapid succession without exchanging the drills or other implements used in such operations.

Another object of this invention is to provide a power tool of the character referred to that may be easily and expertly handled by a single operator. The power tool of the present invention is such that its single operator may readily perform the successive dissimilar operations that heretofore have required two tools and usually two operators.

Another object of this invention is to provide a power tool of the character refered to that is such that the operator may quickly perform the successive operations with the different drills, or the like, without appreciably altering the position of the tool.

Another object of this invention is to provide a power tool of the character mentioned embodying a multiple chuck or head for carrying the different bits, drills, reamers, countersinks, or the like, and supported to be readily moved from one position to the other for the successive use of the various drills, etc.

Another object of this invention is to provide a power tool of the character mentioned in which the bits, drills, etc. of the head are normally idle and undriven so that they cannot injure the work or the workman and remain idle until selectively or individually positioned for use and engaged against the work.

Another object of this invention is to provide a power tool of the character referred to in which the engagement of the selected drill bit, or the like, with the work, and a suitable operating pressure of the same against the work, automatically clutches the bit chuck with the drive means and the release of such pressure automatically disengages the chuck from the power drive. The mere locating of the selected bit, followed by suitable pressure of the bit against the work is all that is required to put the bit into operation and the release of the feed pressure automatically disengages the bit from the power means of the tool. The operator is not obliged to manipulate latches, threaded parts, bolts, switches, or the like, in order to position and condition the bits or other implements for operation.

Another object of this invention is to provide a multiple purpose power tool of the character refered to in which the branches or chuck arms of the head form effective grips or handles for facilitating the handling of the power tool and the accurate operation of the bits, drills, riveting heads, and the like.

Another object of this invention is to provide a multiple chuck means or head attachable to or adaptable to power tools and adapted to carry a plurality of drills, bits, countersinks, reamers, and the like, for successive or selective operation by the tool.

Another object of this invention is to provide a multiple chuck head of the character just mentioned which may be readily applied to the power tool with little or no alteration of either the tool or the head.

A further object of this invention is to provide a multiple chuck head attachable to or adaptable to power tools which is small, compact, light in weight, and inexpensive.

The various objects and features of my invention will be fully understood from the following detailed description of typical preferred forms and applications of my invention, throughout which description reference is made to the accompanying drawing, in which:

Fig. 1 is a side elevation of the power tool provided by this invention with broken lines illustrating a second position of the multiple chuck head. Fig. 2 is an enlarged, vertical, detailed, sectional view of the head showing one of the chucks in position for use but disengaged from the power drive and showing certain parts in side elevation. Fig. 3 is an enlarged, horizontal, detailed, sectional view taken substantially as indicated by line 3—3 on Fig. 2, and Fig. 4 is a transverse, detailed, sectional view taken as indicated by line 4—4 on Fig. 3.

The present invention may be said to comprise, generally, a power tool 10 having a driven shaft 11, and a head attachable to or mounted on the tool 10 and comprising a mounting member 12, a body 13 movably or swingably carried by the member 12, a plurality of bit or implement carrying chucks 14 in the body 13, and means 15 for clutching the chucks 14 with the driven shaft 11.

The power tool 10 may be of any selected or required type and design and of appropriate power rating. The power tool illustrated comprises a housing or casing 16 which encloses the motor M indicated in outline in Fig. 1. A grip or handle 17 is provided on the rear end of the casing 16 and a switch (not shown) for controlling the motor M has a handle part 18 on the handle 17 to be engaged by the operator's hand grasping the handle. The cable or conductor 19 for carrying the operating electrical energy to the tool may enter the handle 17. A portion 20 of reduced diameter continues forwardly from the casing 16. In the case illustrated this portion 20 is located above the longitudinal axis of the tool. The forward part 22 of the reduced portion 20 is further reduced in diameter to provide a forwardly facing annular shoulder 21. The part 22 is preferably, though not necessarily, cylindrical and may have a flat vertical end as illustrated. The power shaft or driven shaft 11 of the tool 10 extends forwardly through the part 22 to project beyond its forward end.

The multiple head of the invention is applied or secured to the forward end of the tool 10 and the mounting member 12 is a fitting, adapter or carrier, readily applied to the tool and serving to support the head thereon. The member 12 may be varied to adapt it for application to power tools of different styles, sizes, etc. In the present case the member 12 is an annular or tubular element fitted over the above mentioned part 22. The member 12 is adapted to be passed onto the part 22 to have its rear end cooperate with the shoulder 21 and an internal shoulder 23 may be formed in the member 12 to engage rearwardly against the end of the part 22. Clamp screws or set screws 24 are threaded in openings in the member 12 and cooperate with the part 22 to secure or fix the member 12 to the power tool 10. The opposite sides of the member 12 have flat vertical bearing faces 25 for the purpose to be later described.

The body 13 of the multiple tool head may vary in design and construction in different applications of the invention. The number of implement holders or chucks 14 employed and the type of the intended work are factors which may determine the shape and construction of the body 13. In the form of the invention illustrated in the drawing the body 13 is designed to carry two implement holders or chucks 14 and the body is a generally L-shaped member. In practice the body 13 may be integral, it being understood that it may be fabricated from two or more sections if desired. The body 13 has two arms or branches A and B joining at a hub which is in the nature of a yoke 26. The branches A and B are preferably alike in size and shape and are elongate tubular parts having central longitudinal openings 27. The openings 27 are of uniform diameter and extend from the yoke 26 to the outer ends of the branches. Where the body 13 has two branches A and B, as illustrated, the openings 27 are at 90° to one another. It is preferred to form and proportion the branches A and B so that they constitute effective grips or handles. In the case illustrated the branches A and B are generally cylindrical and are provided with spaced finger ribs 28 for assuring a better grip.

The yoke 26 of the body 13 is engaged about the mounting member 12, that is, it comprises two side parts engaged against the above mentioned faces 25 of the member 12. Screws 29 are threaded in horizontally aligned openings 30 in the member 12 and have their heads turnably received in horizontally aligned openings 31 in the yoke 26. The screws 29 secure the multiple head to the power tool 10 for swinging about an axis transverse of and intersecting the longitudinal axis of the power shaft 11. The space within the yoke 26 receives the member 12 with sufficient clearance to allow substantial swinging of the head body 13. However, the cooperation of the yoke 26 with the faces 25 holds the body 13 against lateral play or movement. Adjustable stop means are provided to limit the swinging of the body 13 and to stop the body in the two positions where the openings 27 of the branches A and B are longitudinally aligned with the axis of the shaft 11. Lugs 32 are formed on the inner parts of the branches A and B and adjustable screws 33 are threaded into openings in the lugs. The screws 33 extend inwardly beyond the branches A and B and their heads are cooperable with the mounting member 12 to limit swinging of the body 13. Lock nuts 34 are threaded on the screws 33 for setting or securing the screws in their adjusted positions. The head body 13 is swingable through 90° between the position illustrated in full lines in Fig. 1 where the branch A is aligned with the shaft 11 and a position where the branch A projects upwardly, as illustrated by the broken lines, and where the branch B is aligned with the shaft 11. The stop screws 33 serve to stop or position the body 13 in these two positions.

The implement holders or chucks 14 are adapted to receive and hold drills, bits, reamers, etc., of different types and may be varied somewhat to receive and hold different forms of such tools or implements. The chucks 14 illustrated in the drawing are suitable for holding straight shanked drills, etc. There is a socket or chuck means 14 provided in each branch A and B of the head body 13 and the two chucks may be identical or substantially the same. Each chuck 14 includes an elongate tubular member 35 extending longitudinally through the opening 27 of its branch A or B. The members 35 are considerably smaller in diameter than the openings 27 and are of sufficient length to project into the yoke 26. The members 35 are of uniform external diameter except for enlarged heads 36 at their inner ends and reduced or tapered forward parts. The longitudinal openings 37 of the chuck members 35 have reduced forward portions proportioned to rather accurately receive the drills, bits, reamers, etc. The rear portions of the openings 37 are screw threaded to receive screws 38.

The drills or tools are inserted in the chuck members 35 and are moved inwardly until they engage against the screws 38. Thus in the case illustrated it may be considered that the drill D arranged in the chuck 14 of the branch A has its inner end against the screw 38 of that chuck and that the counter-sink C carried by the chuck 14 of the branch B has its inner end engaged against the screw 38 of that chuck. The screws 38 may be adjusted or set to determine the depth of cut or extent of action of the drill D and counter-sink C. Set screws 39 may be threaded through openings in the chuck members 35 to detachably or removably secure the drills, etc. in the chucks.

The chucks 14 further include carriers 40 shiftable longitudinally in the openings 27 of the branches A and B and serving to carry the members 35. The carriers 40 slidably bear in the inner portions of the openings 27 and have reduced portions slidably engaged in bushings 41 secured in the forward ends of the arms A and B. The chuck members 35 are freely turnable in the openings 37 of the carriers 40 and extend beyond the opposite ends of the carriers. The heads 36 cooperate with the inner ends of the carriers 40 and collars 42 are secured to the members 35 and cooperate with the forward ends of the carriers. With this construction the members 35 are freely rotatable relative to the carriers 40 but are obliged to move longitudinally with the carriers.

The clutch means 15 is such that the chuck members 35 of the branches A and B may be individually and selectively connected with the shaft 11 to be driven thereby. The clutch means 15 is such that the tool carrying members 35 are both normally disengaged from the shaft 11 and are only connected with the shaft, for operation thereby, upon the application of force to the power tool 10 when their respective drills D or C are engaged with the work and when their respective branches A or B are aligned with the shaft 11. The clutch means 15 includes cooperating clutch parts on the shaft 11 and the inner ends of the members 35. In the construction illustrated the heads 36 of the members 35 constitute the clutch parts of the members. The heads 35 have transverse or diametrical slots 43. A clutch part 44 is threaded or otherwise fixed on the projecting forward part of the shaft 11 and is provided at its forward end with a transverse clutch rib or tongue 45. A centering or guiding sleeve 46 is fixed on the clutch part 44 and projects forwardly from its end. The forward edge of the sleeve 46 is bevelled inwardly and rearwardly and the rear corners of the heads 36 are bevelled or rounded to facilitate the entrance of the heads 36 into the sleeves 46.

Yielding means are provided for normally holding the chucks 14 forward and extended where their heads 36 are out of cooperation with the clutch part 44 and where their heads 36 cannot interfere with the clutch part or its sleeve 46. The intermediate portions of the carriers 40 are reduced in diameter and springs 47 surround these reduced portions of the carriers. Annular flanges 48 on the reduced portions of the carriers engage the inner ends of the bushings 41 to limit the outward movement of the chucks 14 in their arms A and B. The outer ends of the springs 47 bear against these flanges 48. One or more keys 49 are fixed in the inner portions of the arms A and B and slidably cooperate with keyways 50 formed in the carriers 40. The keys 49 serve to hold the carriers 40 against rotation so that the carriers form effective bearings or bushings for the rotatable implement carrying members 35. The rear ends of the springs 47 bear on the forward ends of the fixed keys 49. The springs 47 are under compression between the flanges 48 and the keys 49 and urge the carriers and the members 35 forwardly or outwardly. The springs 47 are of sufficient strength to normally hold the chucks 14 in positions where their heads 36 are entirely clear of the clutch part 44 and where they will not engage the sleeve 46. The springs 47 are of such strength that there must be deliberate action on the part of the workman or user to engage the heads 36 and clutch part 44. With a branch, say the branch A, aligned with the shaft 11 and with the drill D engaged against the work, pressure on the tool 10 toward the work will overcome the spring 47 in the branch A so that the clutch part 44 is moved forwardly into cooperation with the head 36. This results in the engagement of the tongue 45 in the slot 43 so that the member 35 and its drill D may be driven by the power tool 10.

It is believed that the operation of the tool will be understood from the foregoing detailed description. The multiple head and its carrying member 12 may be constructed as original parts of the power tool 10 or may constitute an attachment or appliance for use on a previously constructed power tool. In the latter case the mounting member 12 is merely arranged on the part 22 of the power tool and is fixed thereto by the screws 24. The head body 13 is readily secured to the mounting member 12 by the screws 29. Drills, reamers, counter-sinks, etc. of different types and sizes may be secured in the chucks 14 of the branches A and B. It is believed that it will be apparent how the drills, bits, reamers, etc. may be adjusted or set in the chucks 14 by means of the screws 38 and then secured in the adjusted positions. With the required or selected drills or other implements fixed in the chucks 14 the tool is in condition for use. In the case illustrated where the arm or branch A carries the drill D and the branch B carries the counter-sink C the drill is employed to form an opening and the counter-sink C is then used to counter-sink the opening thus formed. For the first operation the head body 13 is brought to the position illustrated in full lines in Fig. 1 to align the branch A with the shaft 11. The drill D is engaged against the work and a forward pressure is applied to the power tool 10 to overcome the spring 47 and engage the clutch part 44 with the head 36. The shaft 11 driven by the motor of the power tool 10 drives the chuck member 35 to operate the drill D. During the drilling of the opening the operator may grasp the handle 17 with one hand and may grasp the branch B with the other hand to support the tool and to maintain the head body 13 in the position where the stop screw 33 on the branch B tightly bears against the member 12. It will be observed that the branch B forms an effective handle when the drill carried by the branch A is in use.

For the counter-sinking operation the head body 13 is swung to the position where the branch A projects upwardly as indicated in broken lines in Fig. 1 and where the branch B is aligned with the shaft A. The stop screw 33 of the branch A serves to stop or locate the body 13 in this position. The operator may grasp the handle 17 and the upstanding branch A to support and manipulate the tool. The countersink C is engaged in the previously bored opening and a forward pressure is put on the power tool 10 to engage the clutch part 44 with the head 36 of the chuck 14 in the branch B. The power driven shaft 11 is thus coupled with the countersink C to operate the same. The multiple head body 13 is very easily and quickly swung between its two operative positions and its branches A and B form effective grips or handles facilitating the use of the tool. The multiple head is light in weight and compact, and does not disturb the balance of the tool.

Having described only a typical preferred form and application of my invention, I do not wish to be limited or restricted to the specific details herein set forth, but wish to reserve to myself any variations or modifications that may appear to those skilled in the art, or fall within the scope of the following claims:

Having described my invention, I claim:

1. In combination; a power tool including a tool body, handle means on the tool body for supporting and manipulating the tool, a motor carried by the tool body, and a shaft driven by the motor; and a multiple head for the tool comprising a head body, a plurality of implement chucks on the head body, means for supporting the head body on the tool body for movement between positions where the chucks are individually conditioned for operation by the shaft, abutments on said means, parts on the head body engageable with the abutments to stop the head body in said positions and freely disengageable from the abutments when the head body is to be moved from one position to the other, and clutch means for clutching the chucks with the shaft.

2. In combination; a power tool including a tool body, handle means on the tool body for supporting and manipulating the tool, a motor carried by the tool body, and a shaft driven by the motor; and a multiple head for the tool comprising a head body, a plurality of spaced chucks shiftably carried by the head body, means for securing the head body to the power tool for movement so that the head body may be moved to selectively align the chucks with the shaft, means for clutching the chucks with the shaft upon relative movement between the chucks and head body, and means yieldingly resisting such relative movement between the chucks and head body.

3. In combination; a power tool including a tool body, handle means on the tool body for supporting and manipulating the tool, a motor carried by the tool body, and a shaft driven by the motor; and a multiple head for the tool comprising a head body, a plurality of implement chucks shiftably carried by the head body, means for supporting the head body on the power tool to pivot about an axis transverse of the shaft, means for stopping swinging movement of the head body in positions where the chucks are aligned with the shaft, means for clutching the chucks with the shaft upon relative movement between the chucks when the head is in said positions, and spring means for yieldingly holding the chucks where they are de-clutched from the shaft.

4. A power tool including a motor casing, a motor driven shaft extending from the casing, a mounting member secured to the casing, a head body comprising a yoke and branches diverging from the yoke, means for pivotally mounting the yoke on the member so that the head body may be swung to positions where the branches are aligned with the shaft, chucks shiftably carried by the branches, and means operative upon relative shifting of the head body and chucks with the head body in said positions for clutching the chucks with the shaft.

5. A power tool including a motor casing, a motor driven shaft extending from the casing, a mounting member secured to the casing, a head body comprising a yoke and branches diverging from the yoke, means supporting the yoke on said member so that the body may be swung to positions to align the branches with the shaft, and shiftable spring held chucks carried by the branches and conditioned for driving by the shaft upon relative shifting between the head body and the chucks with the chucks aligned with the shaft.

6. A power tool including a motor casing, a motor driven shaft extending from the casing, a mounting member secured to the casing, a head body comprising a yoke and branches diverging from the yoke, means supporting the yoke on said member so that the body may be swung to positions to align the branches with the shaft, shiftable carriers in the branches, chucks rotatably carried by the carriers, and cooperable clutch parts on the shaft and chucks engageable upon relative shifting between the head body and carriers with the chucks aligned with the shaft.

7. A power tool including a motor casing, a motor driven shaft extending from the casing, a mounting member secured to the casing, a head body comprising a yoke and branches diverging from the yoke, means supporting the yoke on said member so that the body may be swung to positions to align the branches with the shaft, shiftable carriers in the branches, chucks rotatably carried by the carriers, cooperable clutch parts on the shaft and chucks engageable upon relative shifting between the head body and carriers with the chucks aligned with the shaft, and spring means yieldingly holding the chucks in positions where their clutch parts are retracted clear of the clutch part on the shaft.

8. A power tool including a motor casing, a motor driven shaft extending from the casing, a mounting member secured to the casing, a head body comprising a yoke and branches diverging from the yoke, means supporting the yoke on said member so that the body may be swung to positions to align the branches with the shaft, shiftable carriers in the branches, chucks rotatably carried by the carriers, the chucks including means for adjusting the setting of their respective tools, and cooperable clutch parts on the shaft and chucks engageable upon relative shifting between the head body and carriers with the chucks aligned with the shaft.

9. A head for use on a power tool having a casing and a driven shaft extending therefrom comprising a head body having divergent branches, means for mounting the body on the tool casing for swinging movement to selectively align the branches with the shaft, shiftable rotatable chucks in the branches, cooperable clutch parts on the shaft and chucks engageable to drive the chucks when the branches are aligned with the shaft, and spring means yieldingly holding the chucks in positions where their clutch parts are clear of the part on the shaft.

10. A head for use on a power tool having a casing and a driven shaft extending therefrom comprising a head body having divergent branches, means for mounting the body on the tool casing for swinging movement to selectively align the branches with the shaft, shiftable rotatable chucks in the branches, cooperable clutch parts on the shaft and chucks engageable to drive the chucks when the branches are aligned with the shaft, a guide on the clutch part of the shaft for guiding the clutch parts of the chucks into cooperation therewith, and spring means yieldingly holding the chucks in positions where their clutch parts are clear of the part on the shaft.

MARCOS H. LUNA.